(12) United States Patent
Graves

(10) Patent No.: US 9,836,558 B2
(45) Date of Patent: Dec. 5, 2017

(54) ELECTRICAL SYSTEM MAPPING UTILIZING PLUG-IN MODULES

(71) Applicant: Lectrispect, Inc, Golden Valley, MN (US)

(72) Inventor: Kenneth L. Graves, Golden Valley, MN (US)

(73) Assignee: Lectrispect, Inc., Golden Valley, MN (US)

( * ) Notice: Subject to any disclaimer, the term of this patent is extended or adjusted under 35 U.S.C. 154(b) by 326 days.

(21) Appl. No.: 14/658,687

(22) Filed: Mar. 16, 2015

(65) Prior Publication Data

US 2016/0274174 A1 Sep. 22, 2016

(51) Int. Cl.
*G01R 19/00* (2006.01)
*G06F 17/50* (2006.01)
*G01R 19/25* (2006.01)

(52) U.S. Cl.
CPC ..... *G06F 17/5004* (2013.01); *G01R 19/2513* (2013.01)

(58) Field of Classification Search
CPC ................................. G01R 11/19; G01R 11/40
USPC ....................................................... 324/66, 67
See application file for complete search history.

(56) References Cited

U.S. PATENT DOCUMENTS

| | | | | |
|---|---|---|---|---|
| 4,801,868 A | * | 1/1989 | Brooks | G01R 31/02 324/508 |
| 5,172,280 A | * | 12/1992 | Quintus | G11B 5/00817 360/31 |
| 5,808,895 A | * | 9/1998 | Ibrahim | G01R 25/00 324/76.47 |
| 6,163,144 A | | 12/2000 | Steber et al. | |
| 6,400,129 B1 | * | 6/2002 | Yamaguchi | G01R 31/2839 324/76.82 |
| 6,525,665 B1 | * | 2/2003 | Luebke | G01R 1/04 327/133 |
| 6,933,712 B2 | | 8/2005 | Miller et al. | |
| 6,940,289 B2 | * | 9/2005 | Hyacinthe | G01R 27/16 324/534 |
| 7,030,623 B1 | * | 4/2006 | Carpenter | G01R 31/006 324/522 |
| 7,057,401 B2 | * | 6/2006 | Blades | G01R 31/02 324/424 |
| 8,018,219 B2 | | 9/2011 | Calcaterra et al. | |
| 8,018,348 B1 | * | 9/2011 | Pagnani | G01R 31/041 340/635 |
| 8,172,468 B2 | * | 5/2012 | Jones | G02B 6/3879 340/10.1 |
| 8,638,085 B2 | | 1/2014 | Hilton et al. | |

(Continued)

*Primary Examiner* — Tung X Nguyen
*Assistant Examiner* — Dominic Hawkins
(74) *Attorney, Agent, or Firm* — Kinney & Lange, P. A.

(57) ABSTRACT

A system for testing an electrical circuit includes a handheld device, and first and second plug-in modules. The handheld device includes a first sensor that senses a current within the electrical circuit, and a second sensor that senses a voltage within the electrical circuit. The first plug-in device is connectable to a first outlet of the electrical circuit and configured to provide an identification number on the electrical circuit. The second plug-in device is connectable to a second outlet of the electrical circuit and configured to display the identification number of the first plug-in device. The handheld device receives the identification number from the first plug-in device and displays the identification number.

20 Claims, 12 Drawing Sheets

(56) References Cited

U.S. PATENT DOCUMENTS

| | | | | |
|---|---|---|---|---|
| 8,797,723 B2* | 8/2014 | Hilton | .................... | H02G 3/123 |
| | | | | 315/159 |
| 2003/0061582 A1* | 3/2003 | Spirkl | ................... | G06F 11/261 |
| | | | | 716/106 |
| 2004/0008018 A1* | 1/2004 | Miller | ................. | G01R 29/085 |
| | | | | 324/67 |
| 2006/0291119 A1* | 12/2006 | Wang | ..................... | H01H 47/32 |
| | | | | 361/93.1 |
| 2009/0189575 A1* | 7/2009 | Hallak | ............ | G01R 19/16547 |
| | | | | 323/235 |
| 2009/0278524 A1* | 11/2009 | Calcaterra | ........... | G01R 31/045 |
| | | | | 324/66 |
| 2010/0109888 A1* | 5/2010 | Ansaldi | ................ | G01R 31/025 |
| | | | | 340/635 |

* cited by examiner

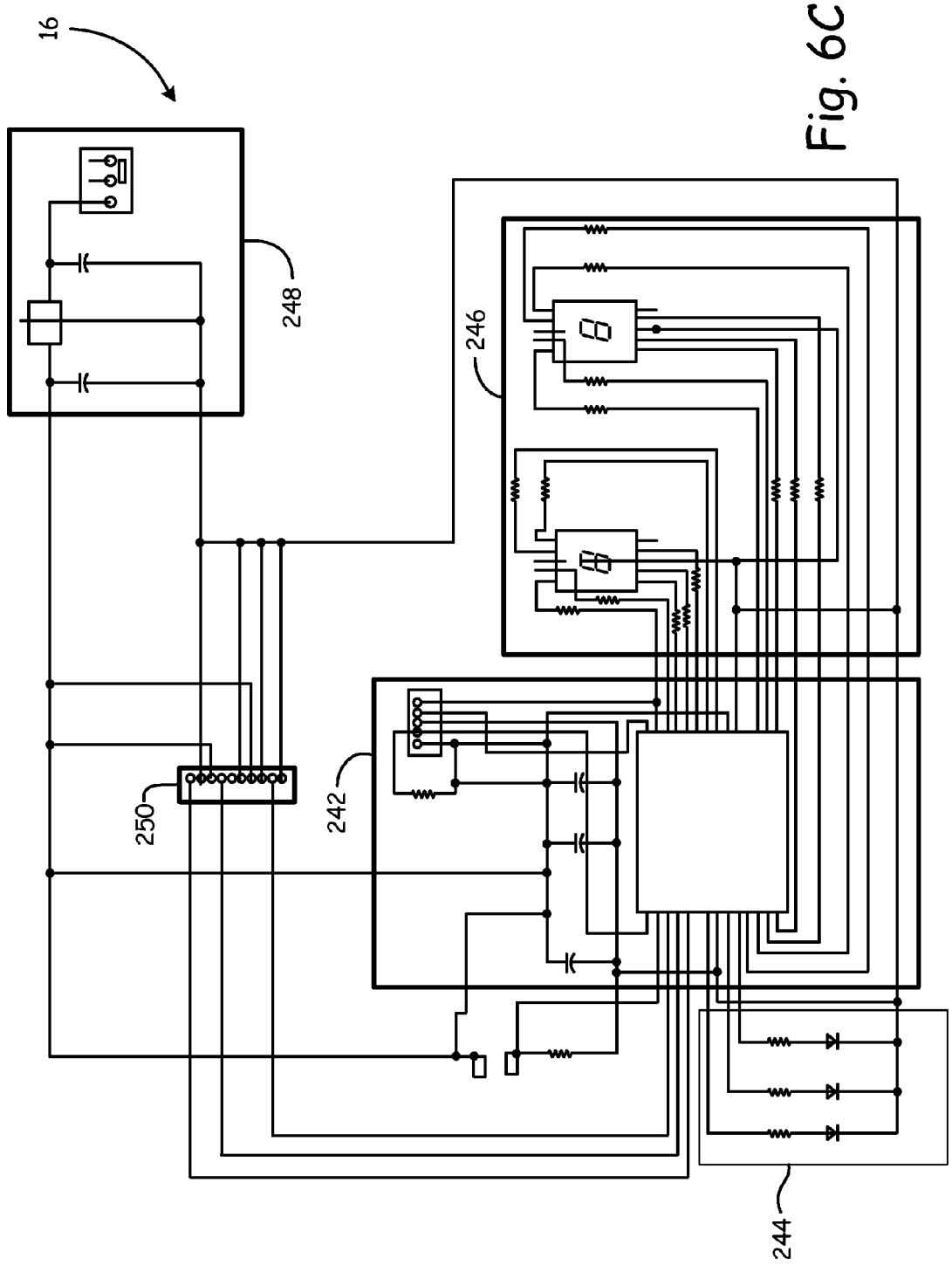

ELECTRICAL SYSTEM MAPPING UTILIZING PLUG-IN MODULES

BACKGROUND

The present invention relates generally to electrical systems, and in particular to a system and method for mapping building electrical systems.

Residential and commercial buildings, for example, often include complex electrical wiring systems that include several branch circuits. Mapping or determining how these branch circuits are distributed once they leave the main electrical circuit breaker panel is an essential safety procedure that is often required, for example, when performing electrical safety inspections, or doing major electrical work. The electrical systems of residential and commercial buildings often change throughout the years, and these changes may not always be documented. It is desirable to provide an efficient and accurate way of mapping building electrical systems.

SUMMARY

A system for mapping an electrical circuit includes a handheld test device, and first and second plug-in modules. The handheld test device includes a first sensor that senses a current within the electrical circuit, and a second sensor that senses a voltage within the electrical circuit. The first plug-in device is connectable to a first receptacle of the electrical circuit and configured to provide an identification number on the electrical circuit. The second plug-in device is connectable to a second receptacle of the electrical circuit and configured to display the identification number of the first plug-in device. The handheld test device receives the identification number from the first plug-in device and displays the identification number.

An apparatus for use in mapping an electrical circuit includes a receiver, a transmitter, a microcontroller, and a display. The receiver is configured to receive pulses on the electrical circuit. The transmitter is configured to generate pulses on the electrical circuit. The microcontroller is configured to determine a status of the apparatus. The display is configured to display a circuit identification number based upon the status of the apparatus An apparatus for use in mapping an electrical circuit includes a first sensor, a microcontroller, and a display. The first sensor is configured to detect current pulses on the electrical circuit. The microcontroller is configured to determine an identification number of the electrical circuit based upon the detected current pulses. The display is configured to output the identification number.

BRIEF DESCRIPTION OF THE DRAWINGS

FIGS. 6A-6C are circuit diagrams illustrating a handheld test device utilized to map an electrical circuit.

DETAILED DESCRIPTION

A system and method is disclosed herein for mapping the electrical distribution of, for example, a commercial or residential building. The system includes a handheld test device and a plurality of plug-in devices. Each plug-in device is connected, for example, to receptacles, switches, light fixtures, or any other outlet of a building's electrical system. Each plug-in device may be either an active or passive plug-in device. A plug-in module connected to a switch, for example, may be a passive plug-in module only. A user begins mapping the electrical distribution system by turning off power to each branch circuit within the main electrical circuit breaker panel. The main circuit breaker is enabled during the electrical system mapping. For each branch circuit, the corresponding circuit breaker is operated in a "flick mode," turning the breaker on, pausing, off, and on again. The breaker is turned off, and the same "flick mode" procedure is repeated on subsequent circuit breakers.

Each plug-in device is programmed with a zero-crossing ID. Following the "flick mode" procedure, each plug-in device connected to the same branch circuit begins counting zero-crossings of the alternating current (AC) line voltage on the branch circuit being mapped. The first plug-in device to reach its zero-crossing ID establishes itself as the active plug-in device for that branch circuit and transmits its branch circuit ID to other plug-in devices connected to the respective branch circuit. The handheld test device senses the current waveforms transmitted from the active plug-in device, and receives and displays the branch circuit ID of the active plug-in device. The other plug-in devices connected to the branch circuit being mapped establish themselves as passive plug-in devices. The passive plug-in devices sense voltage waveforms transmitted from the active plug-in device, and also receive and display the branch circuit ID of the active plug-in device. Following the mapping of all branch circuits, the user may determine the relation among receptacles, switches, light fixtures, and outlets of the building electrical system by observing the branch circuit ID displayed by each plug-in device, and the mapping between the handheld test device and the corresponding circuit breakers.

Figure 1:
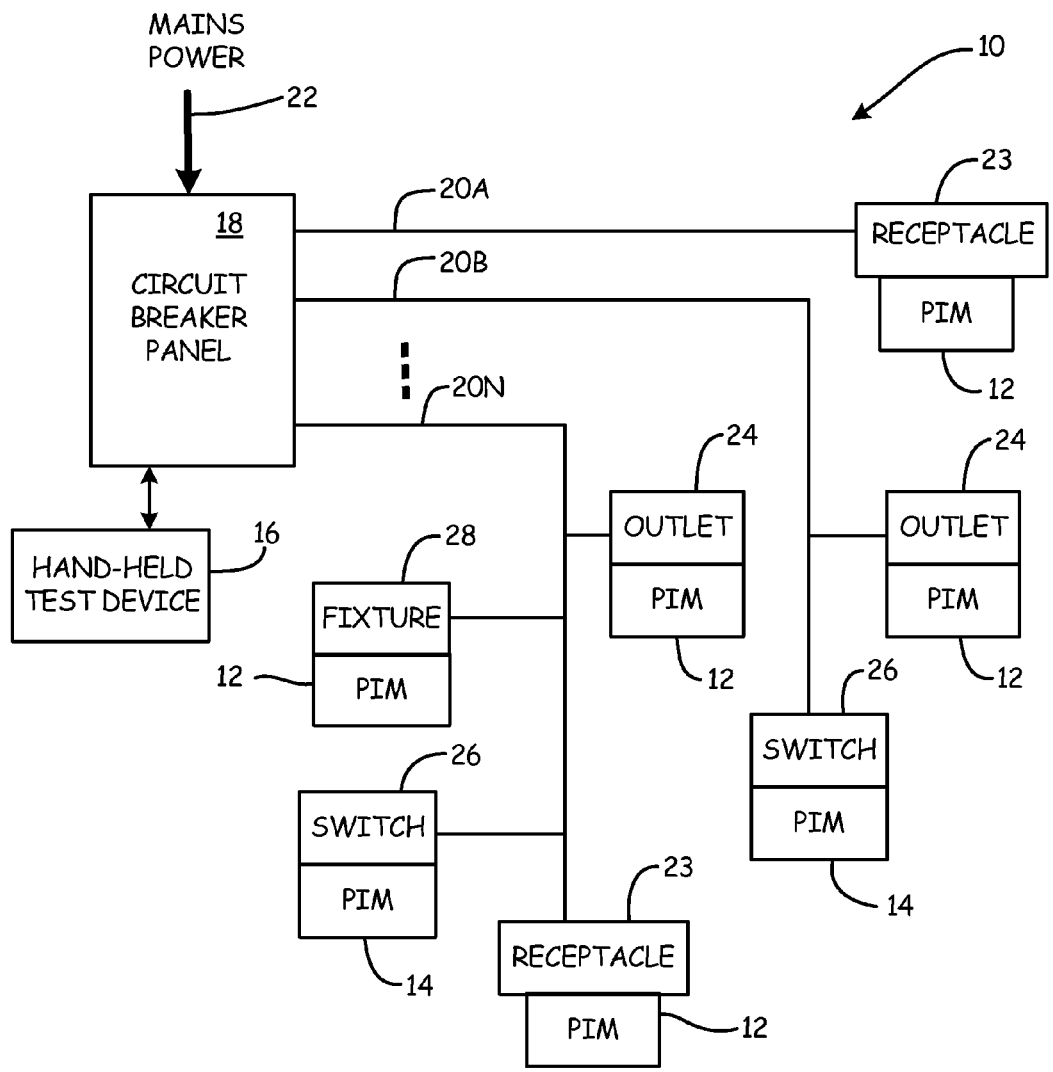
FIG. 1 is a block diagram illustrating an electrical circuit that is mapped using plug-in modules and a handheld test device.

FIG. 1 is a block diagram illustrating electrical system 10 that may be mapped using plug-in modules 12 and 14, and handheld test device 16. Electrical system 10 includes circuit breaker panel 18, branch circuits 20a-20n, mains power input 22, receptacles 23, outlets 24, snap switches 26, and light fixtures 28. In the embodiment illustrated in FIG. 1, plug-in modules 12 are connected to receptacles 23, outlets 24, and fixtures 28, and passive plug-in modules 14 are connected to snap switches 26. Plug-in modules 12 may, for example, be configured in real time as active or passive plug-in modules to either transmit a current waveform or receive a voltage waveform, whereas plug-in modules 14 are, for example, configured as passive plug-in modules to receive a voltage waveform only. Both active and passive plug-in modules 12 and 14 display a branch circuit ID. Each branch circuit 20a-20n may connect to a respective circuit breaker within circuit breaker panel 18. Although illustrated with a single circuit breaker panel 18, buildings may include several circuit breaker panels 18 each having respective branch circuits 20a-20n.

Figure 2:
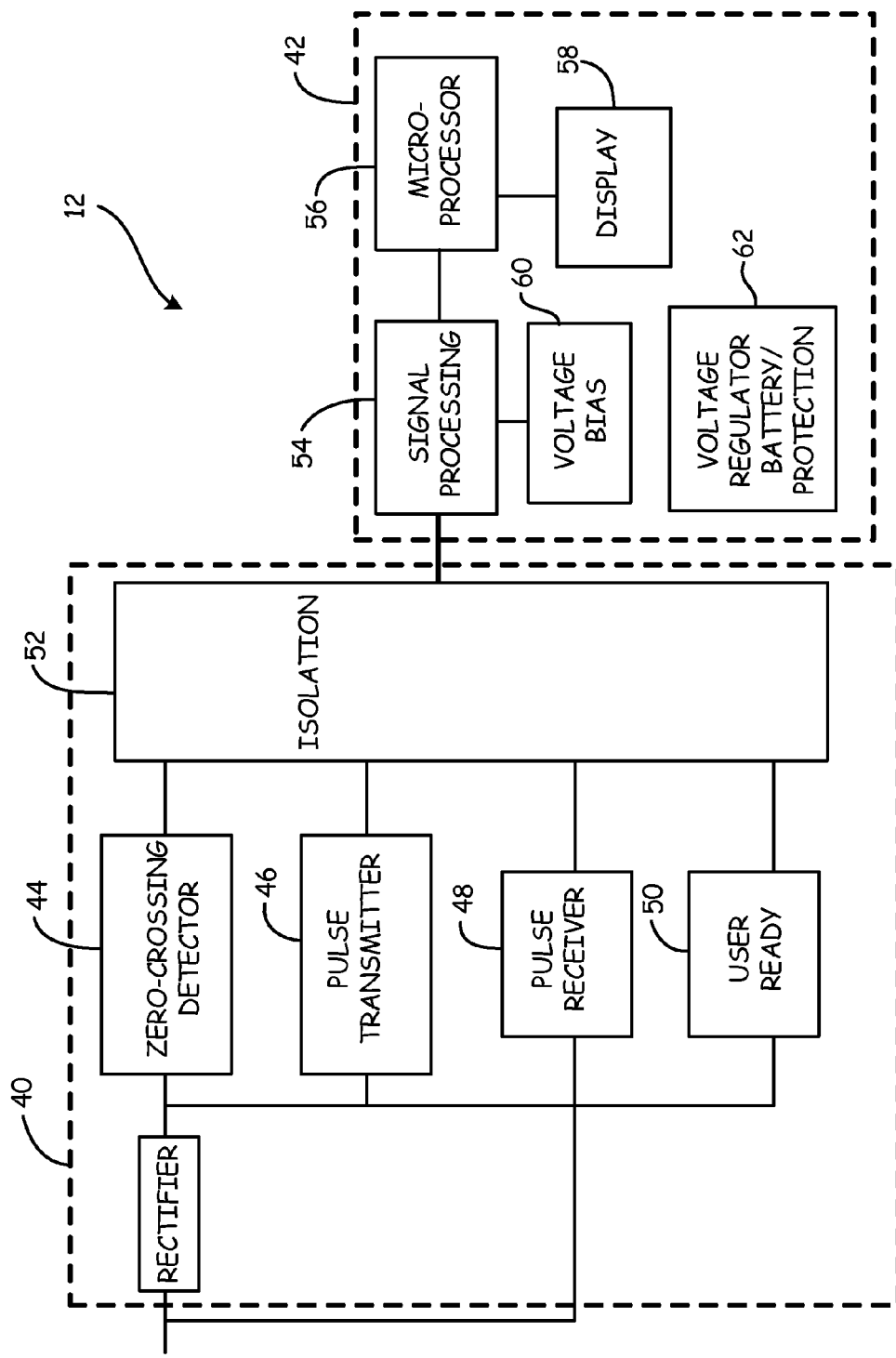
FIG. 2 is a block diagram illustrating a plug-in module utilized to map an electrical circuit.

FIG. 2 is a block diagram illustrating an embodiment of plug-in module 12 utilized to map electrical system 10. Plug-in module 12 includes circuit boards 40 and 42. Circuit board 40 includes zero-crossing detection circuit 44, pulse-transmitter circuit 46, pulse receiver circuit 48, user-ready circuit 50, and isolation circuit 52. Circuit board 42 includes signal processing circuit 54, microprocessor 56, display 58, voltage bias circuit 60, and voltage regulator circuit 62. Although illustrated as printed circuit boards in FIG. 2, plug-in module 12 may be any device or apparatus capable of implementing analog and/or digital circuits. Passive plug-in modules 14 may be implemented in a similar manner but, for example, not include pulse transmission capabilities.

Figure 3A:
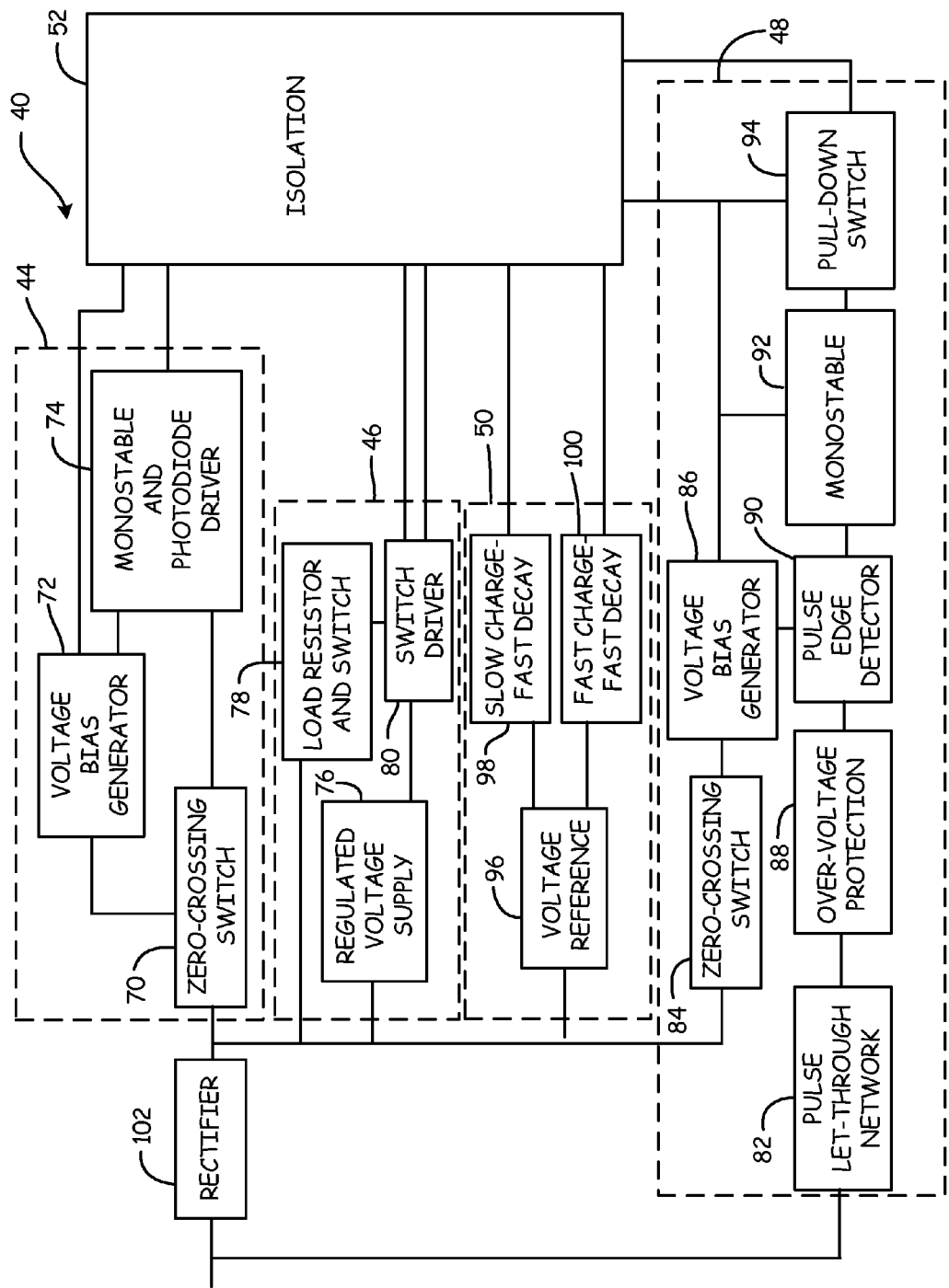
FIGS. 3A and 3B are a block diagram and circuit diagram, respectively, illustrating a first circuit board of a plug-in module.
Figure 3B:
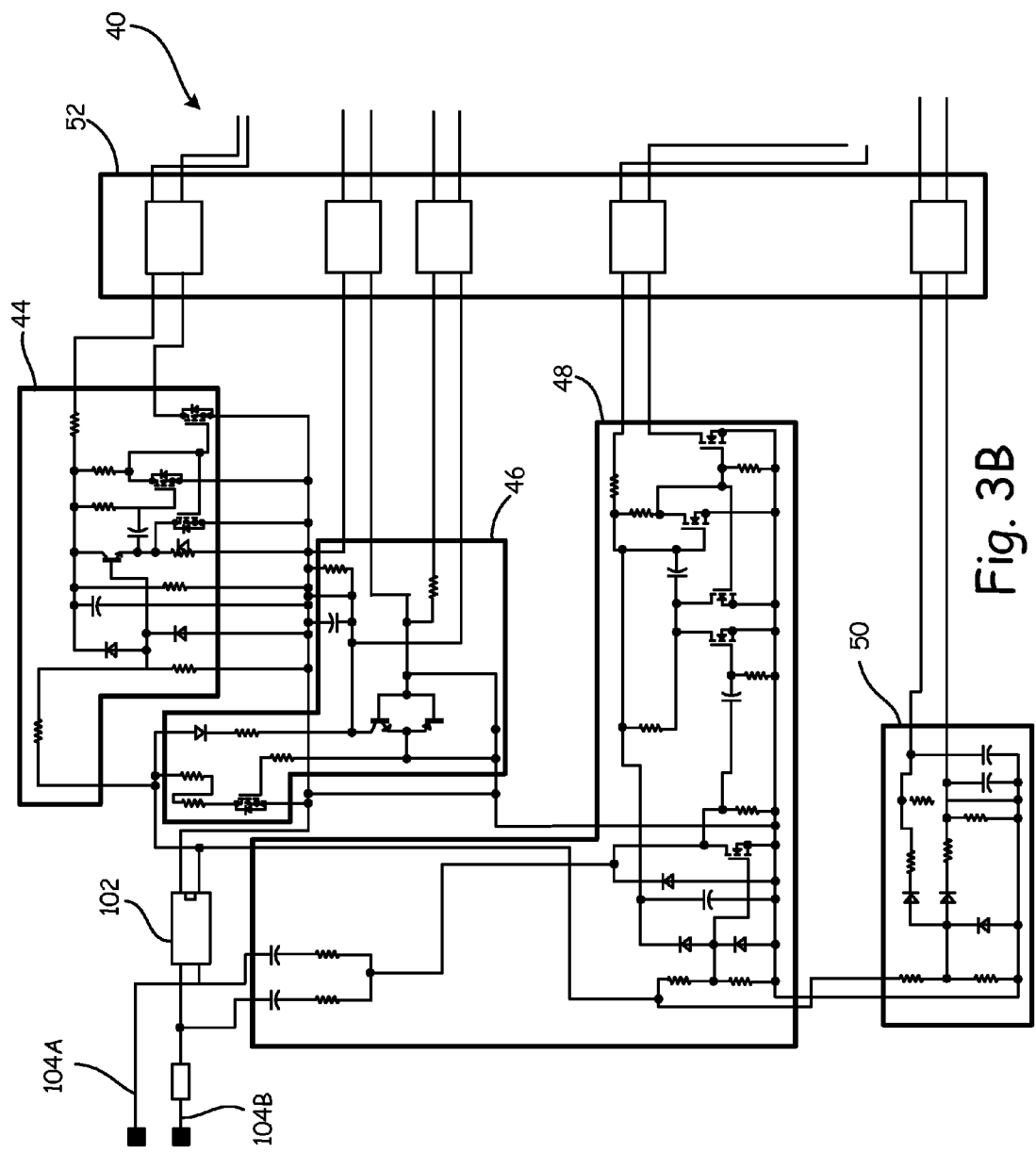

With continued reference to FIG. 2, FIG. 3A is a block diagram illustrating a circuit board 40 and FIG. 3B is circuit diagram illustrating an embodiment of circuit board 40. Zero-crossing detection circuit 44 includes zero-crossing switch circuit 70, voltage bias generator circuit 72, and monostable and photodiode driver circuit 74, pulse-transmitter circuit 46 includes regulated voltage supply circuit 76, load resistor and switch circuit 78, and switch driver circuit 80, pulse receiver circuit 48 includes pulse let-through circuit 82, zero-crossing switch circuit 84, voltage bias generator circuit 86, overvoltage protection and noise blanking circuit 88, pulse edge detector circuit 90, monostable circuit 92, and pull down switch 94, and user ready circuit 50 includes voltage reference circuit 96, slow charge slow decay circuit 98, and fast charge fast decay circuit 100.

Zero-crossing detection circuit 44 may be utilized to determine when a zero-crossing has occurred on the AC line voltage of the branch circuit to which plug-in module 12 is connected. A zero-crossing occurs each time the voltage on the line transitions from a positive value to a negative value, or from a negative value to a positive value. The frequency of zero-crossings on a line depends upon the main source voltage. For example, in the United States, for residential and commercial electrical systems, the alternating current runs at sixty Hertz (Hz) and thus, there are one hundred twenty zero-crossings each second.

Circuit board 40 may include, for example, rectifier 102 that converts alternating current (AC) to direct current (DC) for the AC voltage on input lines 104a and 104b. The output of rectifier 102 is provided to zero-crossing switch circuit 70. Zero-crossing switch circuit 70 provides an output indicative of a zero-crossing of the AC voltage on input lines 104a and 104b. Voltage bias generator 72 provides a source of bias voltage for input to monostable and photodiode driver circuit 74. The output of zero-crossing switch circuit 70 drives monostable and photodiode driver circuit 74. Circuit 74 may be a monostable circuit that provides, for example, a 'one-shot' pulse to drive a switch to turn a photodiode on and off to transmit the zero-crossing signal across isolation circuit 52. Circuit 74 provides the 'one-shot' pulse upon receiving input from zero-crossing switch circuit 70 and DC voltage bias generator 72. This way, zero-crossing detection circuit 44 provides, for example, a one-shot pulse to isolation circuit 52 upon each zero-crossing that occurs on lines 104a and 104b.

Pulse transmitter circuit 46 may be utilized to provide a current pulse input to lines 104a and 104b such that other passive plug-in modules 12 and 14 are able to detect the line voltage disturbance, and handheld test device 16 is able to sense the generated current pulse. Switch driver circuit 80 receives, for example, an enable signal and a driver signal from board 42 through isolation circuit 52. Switch driver circuit 80 then provides a voltage signal to load resistor and switch circuit 78. When load resistor and switch circuit 78 receives the voltage signal, a current pulse is generated on lines 104a and 104b through rectifier 102. Although illustrated as generating a current pulse through rectifier 102, other embodiments may generate the current pulse directly on input lines 104a and 104b. Regulated voltage supply circuit 76 may be utilized to condition the bias voltage for switch driver circuit 80 and the voltage signal provided to load resistor and switch circuit 78.

Pulse receiver circuit 48 may be utilized to detect and receive voltage waveforms or pulses on lines 104a and 104b that are generated by, for example, the active plug-in module 12 connected to lines 104a and 104b. Pulse let-through circuit 82 may be connected directly to input lines 104a-104b to allow for detection of a voltage waveform or pulse on input lines 104a-104b. Overvoltage protection circuit 88 is connected to the output of pulse let-through circuit 82 to, for example, clamp and protect the circuitry of circuit board 40 from overvoltage spikes or ringing during circuit board 40 power up. Overvoltage protection circuit 88 may also, except during zero-crossings, reduce AC line voltage disturbance from reaching pulse edge detector 90. Over-voltage protection circuit 88 unclamps pulse let-through network 82 during the zero-crossing interval and enables the voltage waveform or pulse to reach pulse edge detector 90. Zero-crossing switch circuit 84 may be utilized, for example, to detect a zero-crossing on lines 104a and 104b. Zero-crossing switch circuit 84 may be implemented, for example, in the same manner as zero-crossing switch circuit 70.

Zero-crossing switch circuit 84 may be utilized, for example, to determine when the main AC voltage on lines 104a and 104b is minimal in order to better facilitate detection of voltage waveforms or pulses from the active plug-in module 12 connected to lines 104a and 104b. Voltage bias generator 86 may be utilized to condition the DC bias voltage for pulse edge detector 90, monostable 92, and pull-down switch 94, and may, for example, be implemented in a similar manner to voltage bias generator 72. Pulse edge detector 90 detects, for example, a voltage waveform or pulse from the pulse let-through network 82 during the unclamped zero-crossing interval originating on lines 104a and 104b during a zero-crossing. Monostable circuit 92 is utilized, for example, to provide a one-shot voltage signal upon detection of a voltage pulse on lines 104a and 104b by pulse edge detector 90. Pull-down switch circuit 94 receives the one-shot output from monostable 92 and provides a signal to isolation circuit 52.

User-ready circuit 50 may enable and disable plug-in module 12 and 14 based upon, for example, the signal on lines 104a and 104b. In the embodiment shown in FIG. 2, user-ready circuit 50 is implemented to detect a "flick mode" start by a user at circuit breaker panel 18. For example, when a user at circuit breaker panel 18 is ready to map a respective branch circuit 20a-20n, the user may perform a "flick-mode" start which includes an on-pause-off-on procedure. For example, the user turns on the circuit breaker in circuit breaker panel 18 for the respective branch circuit 20a-20n for a short time period of, for example, one or two seconds. The user then turns the circuit breaker off and immediately back on again. Voltage reference circuit 96 may be, for example, a voltage divider utilized to provide a desired voltage level to slow charge slow decay circuit 98 and fast charge fast decay circuit 100.

Slow charge slow decay circuit 98 and fast charge fast decay circuit 100 may be implemented, for example, as resistor-capacitor timer circuits. The values of the resistor and capacitor for slow charge slow decay circuit 98 may be selected such that the capacitor charges at a slower rate, and discharges at a slower rate, than that of fast charge fast decay circuit 100. The initial turn-on of the respective circuit breaker in circuit breaker panel 18 for branch circuit 20*a*-20*n* charges the capacitors of slow charge slow decay circuit 98 and fast charge fast decay circuit 100 such that a user ready signal does not reach isolation circuit 52 and may, for example, reverse bias a photodiode in isolation circuit 52. The user turns off the circuit breaker in circuit breaker panel 18 to the respective branch circuit 20*a*-20*n* after the short capacitor charge time. This discharge or "off" time period, for example, is such that fast charge fast decay circuit 100 dissipates capacitor charge at a faster rate than slow charge slow decay circuit 98 and provides a forward bias to a photodiode in isolation circuit 52, providing a logic high output at isolation circuit 52. This may be utilized, for example, by microprocessor 56 to determine that a mapping of a respective branch circuit 20*a*-20*n* is about to begin. Following turn-off and turn-on of the circuit breaker in circuit breaker panel 18 by the user, both slow charge slow decay circuit 98 and fast charge fast decay circuit 100 charge to the point of disabling the logic high output in isolation circuit 52. Both slow charge slow decay circuit 98 and fast charge fast decay circuit 100 providing a logic high output may be utilized, for example, by microprocessor 56 to begin the mapping of the respective branch circuit 20*a*-20*n*.

Figure 4:
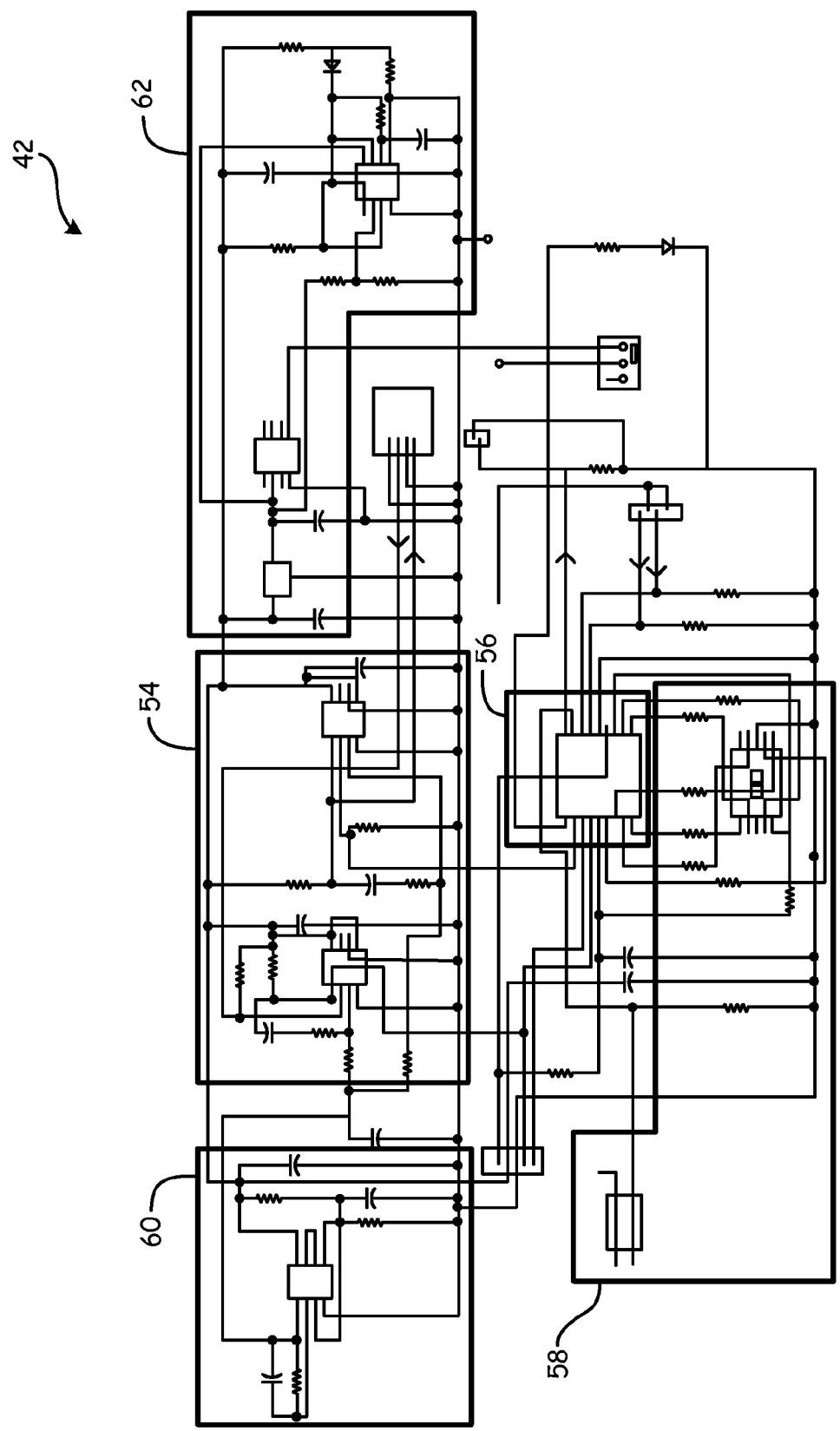
FIG. 4 is a circuit diagram illustrating a second circuit board of a plug-in module.

With continued reference to FIG. 2, FIG. 4 is a circuit diagram illustrating circuit board 42. Signal processing circuit 54 is configured to communicate with circuit board 40 through isolation circuit 52. Isolation circuit 52 is utilized to provide, for example, galvanic isolation between circuit boards 40 and 42. Isolation circuit 52 may be implemented, for example, using photodiodes or any other circuitry that provides isolation for circuit boards 40 and 42. Signal processing circuit 54 and voltage bias circuit 60 may be utilized, for example, to condition the signals between microprocessor 56 and isolation circuit 52. This may include, for example, analog-to-digital and/or digital-to-analog conversion, amplification, and/or any other type of signal processing. Voltage regulator circuit 62 may be utilized to regulate the voltage within plug-in modules 12 and 14, indicate low battery voltage, and also provide reverse battery protection for battery powered circuitry included in plug-in modules 12 and 14.

Microprocessor 56 may be utilized, for example, to execute soft-coded and/or hard-coded instructions for plug-in modules 12 and 14. Microprocessor 56 may, for example, be utilized to count zero-crossings. In the embodiment shown in FIGS. 2-4, once user ready circuit 50 indicates that the user is ready to map the respective branch circuit 20*a*-20*n*, microprocessor 56 may begin counting zero-crossings. A counter may be implemented, for example, in a memory internal to microprocessor 56, or external to microprocessor 56 on circuit board 42. Microprocessor 56 may also be programmed with a zero-crossing identification number (ID) and/or branch circuit identification number (ID) different from each of the other plug-in modules 12 and 14.

The zero-count may be incremented each time a zero-crossing is detected on lines 104*a* and 104*b* by zero-crossing detector 44. Following each detection of a zero-crossing, microprocessor 56 may compare the current zero-count with the stored zero-crossing ID. If the current zero-count matches the zero-crossing ID, microprocessor 56 may designate its respective plug-in module 12 as the active plug-in module and provide a first framing current pulse through pulse transmitter circuit 46. Microprocessor 56 may be, for example, configured to transmit the first framing current pulse during the following zero-crossing. The first framing current pulse is received by handheld test device 16.

If a first framing voltage pulse is received by microprocessor 56 prior to its zero-count reaching its zero-crossing ID, microprocessor 56 may designate its respective plug-in module 12 as a passive plug-in module for the respective branch circuit 20*a*-20*n*. Following reception of the first framing voltage pulse, passive plug-in module 12 may automatically implement a "repeat" and restart its zero-count and once again begin counting zero-crossings. Microprocessor 56 may continue to count zero-crossings until a second framing voltage pulse is received through pulse receiver circuit 48 from the active plug-in module 12 for the respective branch circuit 20*a*-20*n*. For example, one way (simplex channel) communications may automatically resend signals as an error detection technique.

If plug-in module 12 is designated as the active plug-in module, following output of the first framing current pulse, microprocessor 56 may once again automatically implement a "repeat" and restart its zero-count and once again begin counting zero-crossings. The zero-count is reset, and incremented at each detected zero-crossing until the zero-count once again reaches the active plug-in module zero-crossing ID. At this time, microprocessor 56 may send out a second framing current pulse during the following zero-crossing, at which point the voltage waveform or pulse may be received by each of the other passive plug-in modules 12 and/or 14 on the respective branch circuit 20*a*-20*n*, as well as handheld test device 16.

Microprocessor 56 may also be configured to, for example, transmit its programmed zero-cross ID or other identification code as a byte or word of information on to AC voltage lines 104*a* and 104*b*. In an embodiment, following the second framing pulse, microprocessor 56 may provide, for example, a byte of data for the following eight zero-crossings. During each zero-crossing, a binary 'one' may be provided by generating a current pulse on lines 104*a* and 104*b* through pulse transmitter circuit 46. A binary 'zero' may be provided by not generating a current pulse on lines 104*a* and 104*b* during the zero-crossing. While described as providing serial data over lines 104*a* and 104*b*, any other method of data transmission may be implemented to communicate data from the active plug-in module 12 to other software configured passive plug-in modules 12 and/or hardware configured passive plug-in module 14, and handheld test device 16.

Plug-in modules 12 designated as passive plug-in modules, and passive plug-in modules 14 may, for example, receive the data transmitted following the second framing pulse from the active plug-in module 12. Microprocessor 56 may receive voltage pulses through pulse receiver circuit 48 at each zero-crossing following reception of the second framing pulse. For each zero-crossing, microprocessor 56 may read and store a binary 'one' bit if a voltage pulse is detected, or a binary 'zero' bit if a voltage pulse is not detected. Following reception of, for example, eight bits, microprocessor 56 may interpret the identification number ID of the active plug-in module 12.

The active and all other passive plug-in modules 12 and 14 may display the identification number ID of the active plug-in module 12. Microprocessor 56 may be configured, for example, to display the identification number ID on display 58. Display 58 is any display device such as, for example, a light-emitting diode (LED) display. A backup battery may be included within plug-in modules 12 and 14 to continue to power the plug-in modules following turnoff of the circuit breaker for the respective branch circuit 20a-20n or disconnection from the electrical device by the user. This is useful if the user would like to map all branch circuits 20a-20n prior to traversing the building without losing data or to read the identification number displayed by each plug-in module 12 and 14 after disconnecting the plug-in modules from the AC voltage before organizing the mapping data.

The identification number ID may or may not be equal to the zero-crossing ID of the active plug-in module. If the identification number is equal to the zero-crossing ID, then each active plug-in module 12 and other passive plug-in modules 12 and 14 and handheld test device 16 will display the zero-crossing ID of the active plug-in module 12 for the respective branch circuit 20a-20n. If a separate branch circuit ID is utilized, then each active plug-in module 12 and other passive plug-in modules 12 and 14 and handheld test device 16 may, for example, be programmed with a lookup table to determine the active plug-in module branch circuit ID based upon the number of zero-crossings counted between framing pulses. This look up table may then be utilized to verify that the number of zero-crossings between framing pulses matches the branch circuit ID provided on lines 104a and 104b following the second framing pulse. Either method could in implemented in microprocessor circuit 56 memory. This is useful for error detection during mapping of the respective branch circuit 20a-20n. If the zero-crossing count between the end of the user ready signal and the first framing current pulse is different from the zero-crossing count between the first and second framing pulse, an error is detected. If the zero-cross count does not match the look up table identification code, an error is detected. There may also be other software error detection schemes implemented. If an error is detected, microprocessor 56 of passive plug-in module 14 and handheld test device 16 may output an error indication to display 58 and display 246, respectively. The error indication may be displayed in any way, such as through the use of error codes, error messages, or LED's.

Figure 5A:
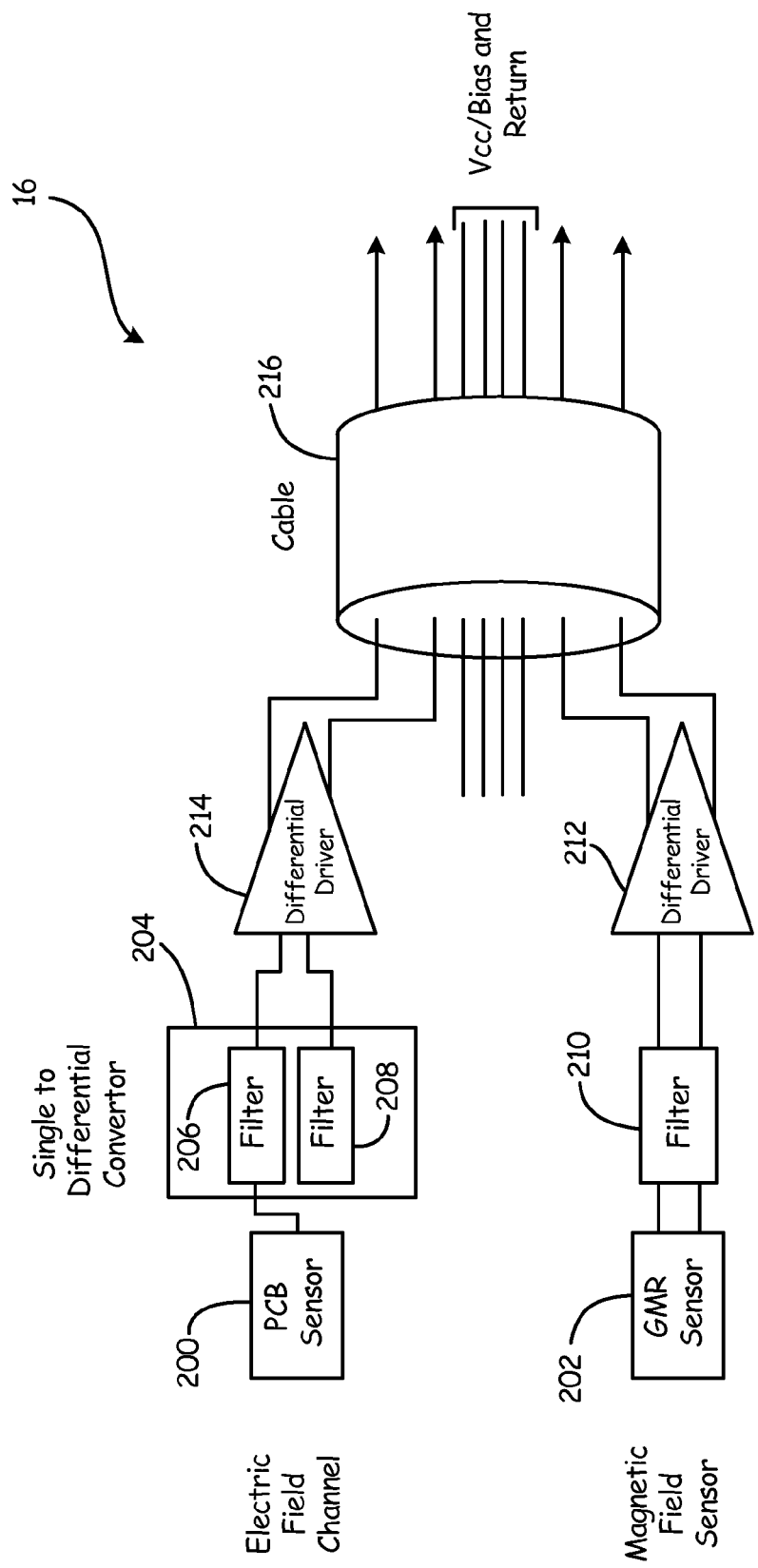
FIGS. 5A and 5B are block diagrams illustrating a handheld test device utilized to map an electrical circuit.
Figure 5B:
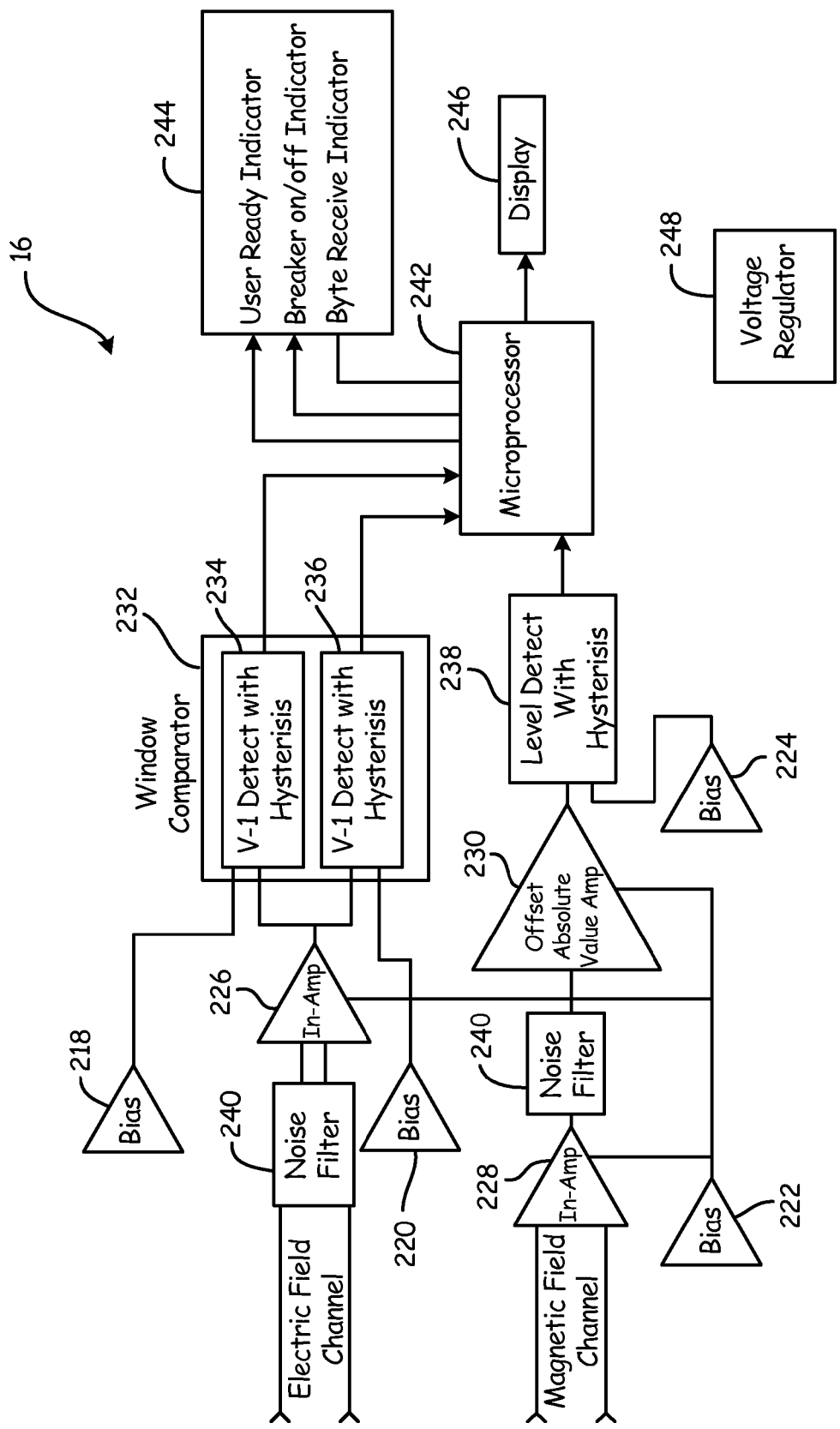
Figure 6A:
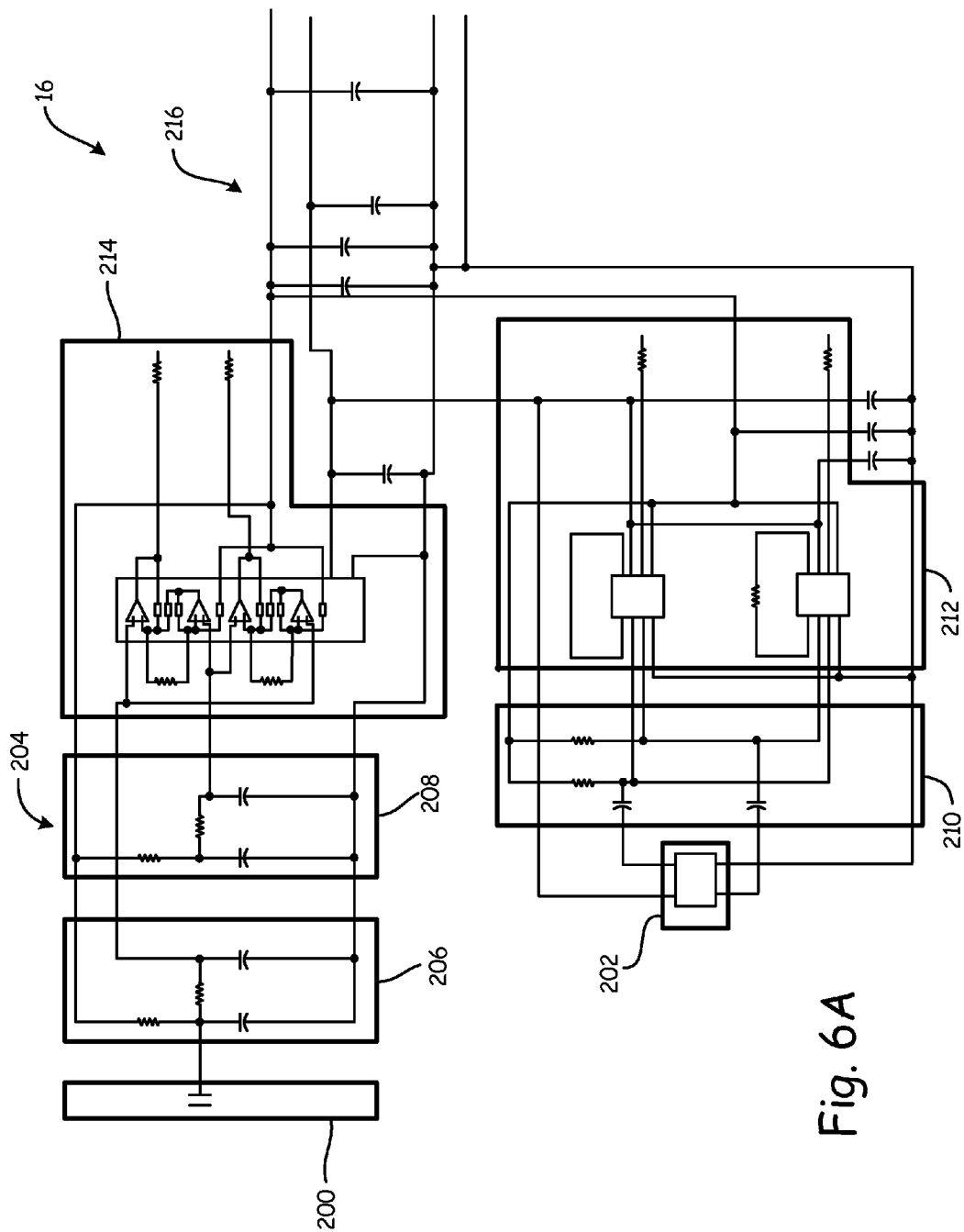
Figure 6B:
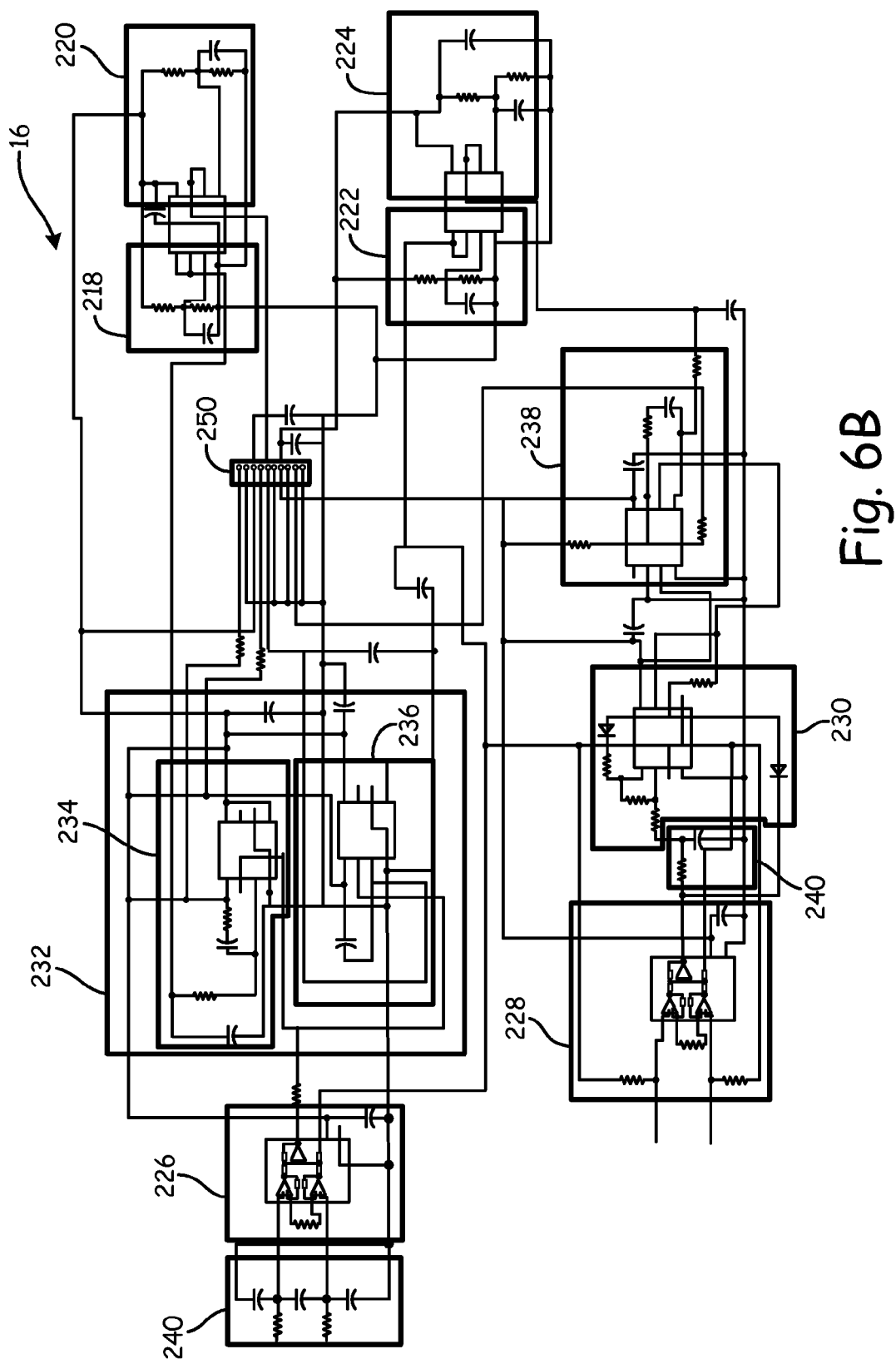

FIGS. 5A and 5B are block diagrams illustrating an embodiment of handheld test device 16 utilized to map electrical system 10. FIGS. 6A-6C are circuit diagrams illustrating an embodiment of handheld test device 16 utilized to map electrical system 10. Handheld test device 16 includes electric field sensor 200, magnetic field sensor 202, single-to-differential convertor 204, filters 206, 208, and 210, differential drivers 212 and 214, cable 216, bias circuits 218, 220, 222, and 224, amplifiers 226, 228, and 230, window comparator 232, hysteresis circuits 234, 236, and 238, noise filters 240, microprocessor 242, indicators 244, display 246, and voltage regulator 248.

Handheld test device 16 may be configured such that electric field sensor 200 and magnetic field sensor 202 sense fields on the respective branch circuit wire connected to circuit breaker panel 18 without contacting the wire. Electric field sensor 200 is any sensor capable of sensing an electric field such as, for example, a wire antenna. Magnetic field sensor 202 is any sensor capable of sensing a magnetic field such as, for example, a giant magneto resistive (GMR) device.

In the embodiment shown in FIG. 5A, electric field sensor 200 provides a single-ended output. The single-ended output is converted to a filtered differential output through single-to-differential converter 204 and filters 206 and 208. A differential output may be desirable as it provides common mode noise immunity and greater slew rate than a single-ended output. Magnetic field sensor 202 may provide a differential output that is filtered by filter 210. Filters 206, 208, and 210 are any circuit noise filters and may be implemented, for example, using resistors and capacitors to filter electromagnetic interference. Differential drivers 212 and 214 may be implemented to, for example, amplify and drive the output from magnetic field sensor 202 and electric field sensor 200, respectively, through cable 216. Cable 216 may be shielded and allow signal processing circuits of handheld test device 16 to be located away from, and isolated from, the branch circuit being mapped.

Bias circuits 218, 220, 222, and 224 may be utilized to, for example, establish desired voltages and/or currents at points within the circuit to establish desired operating conditions. Voltage regulator 248 is illustrated as a pair of capacitors, and a positive voltage regulator integrated circuit in FIG. 6C, but may be implemented as any circuit that provides voltage regulation for handheld device 16.

The electric field differential signal from differential driver 214 may be filtered by noise filter 240, which is any noise filter circuit utilized to filter electromagnetic interference. The output of filter 240 may be provided to, and conditioned by, instrumentation amplifier 226. Window comparator 232, which includes hysteresis circuits 234 and 236, receives the output of instrumentation amplifier 226. Hysteresis circuits 234 and 236 may be configured to, for example, provide an output based upon past and/or present values from bias circuits 218 and 220, and amplifier 226. The outputs of window comparator circuit 232 are provided to microprocessor 242. Microprocessor 242 may utilize the outputs of hysteresis circuits 234 and 236 to detect, for example, zero-crossings on the branch circuit wire connected to circuit breaker panel 18 that is sensed by electric field sensor 200.

The magnetic field signal provided by differential driver 212 may be received and conditioned by amplifiers 228 and 230, noise filter 240, and bias circuit 222. The output of amplifier 230 is provided to hysteresis circuit 238. Hysteresis circuit 238 may be utilized, for example, to provide an output to microprocessor 242 based upon present and/or past values from bias circuit 224 and amplifier 230. Microprocessor 242 may, for example, utilize the output from hysteresis circuit 238 to detect stray noise current, or current pulses from active plug-in modules 12, or any other current that may be sensed by magnetic sensor 202 in the branch circuit wire connected to circuit breaker panel 18.

Microprocessor 242 may provide similar functionality and/or additional functionality to that of microprocessor 56 of plug-in modules 12 and 14. For example, microprocessor 242 may monitor the outputs of sensors 200 and 202 to determine, among other associated attributes, when a user begins mapping of a branch circuit 20a-20n, when AC line voltage zero-crossings are occurring, when stray unwanted current is present on the branch circuit 20a-20n during a mapping, the timing and duration of framing current pulses provided on branch circuit 20a-20n from the active plug-in module 12, and current pulses provided by the active plug-in module 12 indicative of the active plug-in module 12 branch circuit ID.

Microprocessor 242 may, for example, first detect the end of the user ready signal 50 and begin counting zero-crossings based upon the output of hysteresis circuits 234 and 236. Microprocessor 242 may, for example, detect a first framing current pulse based upon the output of hysteresis circuit 238. Upon detection of the first framing current pulse, microprocessor 242 may automatically implement a "repeat" and restart its zero count and once again begin counting zero-crossings based upon the output of hysteresis circuits 234 and 236. Microprocessor 242 may continue to count zero-crossings until a second framing current pulse is detected based upon the output of hysteresis circuit 238. Upon receipt of the second framing current pulse, microprocessor 242 may begin to detect current pulses, for example, during the following eight zero-crossings. For each detected current pulse during a zero-crossing, a logic one is determined, and for each zero-crossing without a detected current pulse, a logic zero is determined. This allows the active plug-in module 12 to transmit its branch circuit ID to handheld test device 16.

The received ID from active plug-in module 12 may be a unique and separate branch circuit ID stored in memory of microprocessor 242, or may correspond to the zero-crossing ID stored in memory of microprocessor 242 of active plug-in module 12. For either coding scheme, microprocessor 242 may verify the received ID by first comparing the number of zero-crossings between the end of the signal from user ready circuit 50 and the first framing current pulse, and by comparing the number of zero-crossings between the first and second framing current pulses, or by comparing the number of zero-crossings between the first and second framing current pulses only. If the received ID does not equal the zero-crossing ID, an error is detected. If microprocessor 242 has a look up table stored in memory, the received ID is compared with the branch circuit ID. If the received ID does not equal the branch circuit ID, an error is detected. If the zero-crossing ID does not equal the received ID, or if the branch circuit ID does not equal the received ID, then microprocessor 242 may indicate an error which may be displayed using display circuit 246 and/or indicators 244.

Display 246 may be utilized, for example, to display the received ID from active plug-in module 12 upon verification of its accuracy. Although illustrated in FIG. 6C as two LED display units, display circuit 246 may be implemented as any type of display, and may be utilized to display any information for handheld test device 16. As illustrated in FIG. 5B, indicators 244 include a user ready indicator, a breaker on/off indicator, and a byte received indicator. Indicators 244 may also include any other desired visual indicators.

Figure 7:
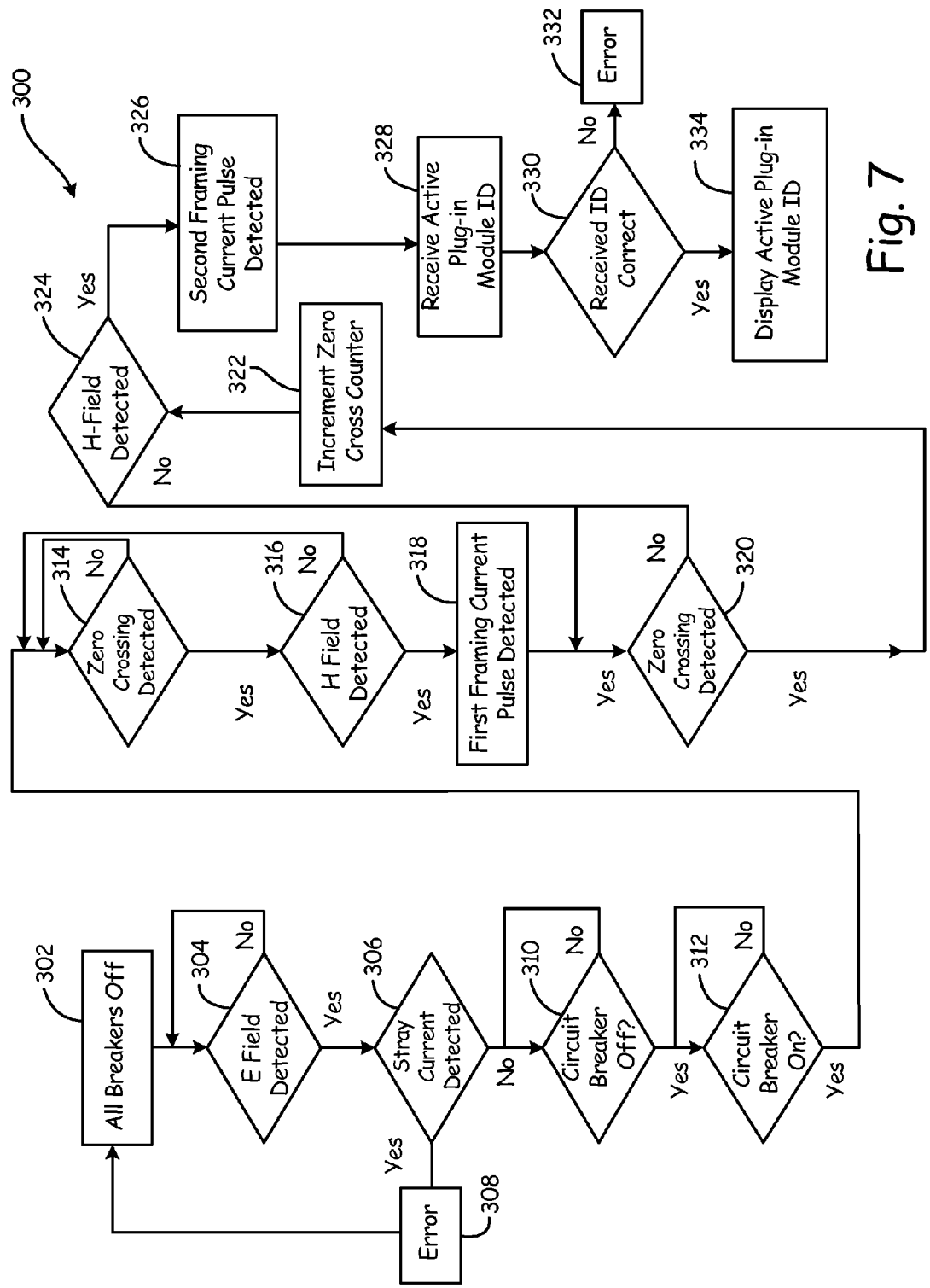
FIG. 7 is a flowchart illustrating a method for mapping a building electrical circuit using a handheld test device.

FIG. 7 is a flowchart illustrating method 300 for mapping electrical system 10. Method 300 may, for example, be implemented in software that runs on handheld test device 16. Method 300 may be repeated for the main circuit breaker panel and each sub-panel, if applicable. For the main circuit breaker panel and each sub-panel, method 300 begins at step 302. At step 302, all circuit breakers in the main circuit breaker panel are turned off. The main circuit breaker is always on. Method 300 may be repeated for each sub-panel after all circuit breakers are turned off except the corresponding sub-panel circuit breaker.

At step 304, it is determined, using handheld test device 16, whether an electric field is present on the AC line. Method 300 remains at step 304 until an electric field is detected. Upon detection of an electric field, which indicates that the breaker for the respective branch circuit has been turned on, method 300 proceeds to step 306. At step 306, it is determined, using handheld test device 16, if there is stray current detected in the respective circuit branch 20a-20n connected to the respective circuit breaker panel 18. If stray current is detected, method 300 proceeds to step 308. If stray current is not detected, method 306 proceeds to step 310. At step 308, an error is indicated by handheld test device 16. Method 300 returns to step 302, for example, upon a user clearing the error code and turning off the respective circuit breaker.

At step 310, it is determined, using handheld test device 16, if the respective circuit breaker is off. Method 300 remains at step 310 until the circuit breaker is off. At step 312 it is determined, using handheld test device 16, if the respective circuit breaker is on. Method 300 remains at step 312 until the circuit breaker is on. Steps 306-312 comprise detecting the "flick mode" operation of the circuit breaker for the respective branch circuit 20a-20n.

At step 314, zero-crossings are detected by handheld test device 16. Method 300 remains at step 314 until a zero-crossing is detected and then proceeds to step 316. At step 316, it is determined, using handheld test device 16, if a magnetic field is present. If a magnetic field is present, method 300 continues to step 318 where a first framing current pulse is detected, and method 300 continues to step 320. If a magnetic field is not present, method 300 returns to step 314 until a zero-crossing occurs. At step 318, the first framing current pulse is detected. At step 320, method 300 waits for the next zero-crossing to occur before handheld test device 16 begins counting zero-crossings at step 322. Method 300 increments a zero-crossing counter at step 322 and proceeds to step 324. Steps 314-322 comprise counting of zero-crossings between the first and second framing current pulses.

At step 324, it is determined, using handheld test device 16, if a magnetic field is present. If a magnetic field is present, method 300 continues to step 326 where a second framing current pulse is detected. If a magnetic field is not present, method 300 returns to step 320 until a zero-crossing occurs. At step 326, it is determined that a second framing current pulse has occurred, and method 300 proceeds to step 328. At step 328, handheld test device 16 receives an ID transmission from the active plug-in module 12. This may be accomplished, for example, by sending current pulses from the active plug-in module 12 to the handheld test device 16 over the AC line during zero-crossings. For each zero-crossing, if a magnetic field is detected, then the bit is a one, and if no magnetic field is present, then the bit is a zero. This may continue, for example, for eight bits or any number of required bits. The received ID from the active plug-in module 12 may be, for example, the zero-crossing ID or branch circuit ID of the active plug-in module 12 connected to the corresponding branch circuit 20a-20n. At step 330, the zero-crossing counter is compared to the received ID for error detection. If the received ID does not match the zero-crossing ID or the branch circuit ID from a look up table for the active plug-in module 12, method 300 proceeds to step 332 and an error code or message is displayed by handheld device 16. If the zero-crossing ID matches the received ID, method 300 proceeds to step 334 and handheld test device 16 displays the ID of the active plug-in module 12 for the respective branch circuit 20a-20n.

Method 300 may be performed for each branch circuit wire connected to a circuit breaker in main circuit breaker panel 18. In this way, the identification number for each branch circuit 20a-20n may be recorded. A user may travel throughout the building and record the displayed ID for each plug-in module 12 and 14. This way, each outlet, receptacle, switch, and light fixture in the building may be mapped to a specific circuit breaker within, for example, breaker panel 18.

Figure 8:
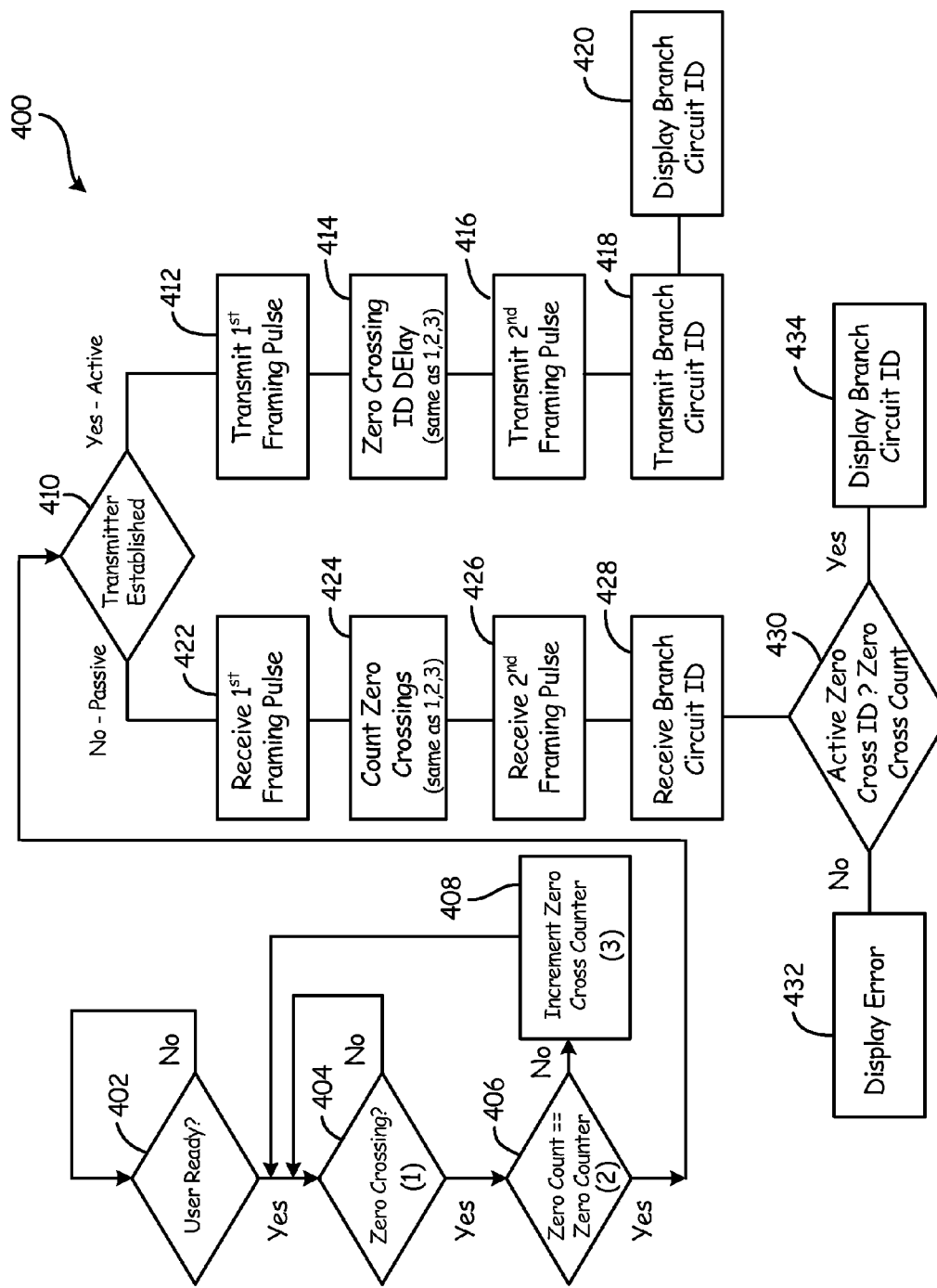
FIG. 8 is a flowchart illustrating a method for mapping a building electrical circuit using plug-in modules.

FIG. 8 is a flowchart illustrating method 400 for mapping electrical system 10. Method 400 may, for example, be implemented in software that runs on plug-in modules 12 and 14. Method 400 begins, and remains, at step 402 until it is determined that the user is ready from, for example, user ready circuit 50 of a respective plug-in module 12 and 14. Following detection that the user is ready, method 400 proceeds to step 404. Method 400 remains at step 404 until a zero-crossing is detected on lines 104a and 104b by a respective plug-in module 12 and 14. Following detection of a zero-crossing, method 400 proceeds to step 406 and each plug-in module 12 compares the present zero-count with the respective zero-crossing ID of plug-in module 12. At step 406, if a match is detected by any of plug-in modules 12, method 400 proceeds to step 410. If no match is detected, method 400 proceeds to step 408 and each plug-in module 12 and 14 increments its respective zero-count. Following step 408, method 400 returns to step 404 and continues counting zero-crossings.

At step 410, an active plug-in module 12 is established. The active plug-in module 12 is the plug-in module 12 that matched its zero-count with its respective zero-crossing ID at step 406. For each plug-in module 12 and 14 being utilized to map the respective branch circuit 20a-20n, the active plug-in module 12 proceeds to step 412, and the passive plug-in modules 12 and 14 proceed to step 422.

At step 412, the active plug-in module 12 transmits a first framing pulse on lines 104a and 104b. At step 414, there is a zero-cross delay, in which all plug-in modules 12 and 14 recount zero-crossings up to the zero-crossing ID of the active plug-in module 12. This may be accomplished using the same method as in steps 404-408. At step 416, following the zero-crossing delay, the active plug-in module 12 transmits a second framing pulse on lines 104a and 104b. At step 418, the active plug-in module 12 transmits its branch circuit ID, for example, on lines 104a and 104b for the following eight zero-crossings. At step 420, the active plug-in module 12 displays its branch circuit ID on the respective display 58.

At step 422, for passive plug-in modules 12 and 14 on the respective branch circuit 20a-20n, each passive plug-in module 12 and 14 receives the first framing pulse from the active plug-in module 12. At step 424, all plug-in modules 12 and 14 recount zero-crossings up to the zero-crossing ID of the active plug-in module 12. Step 424 happens simultaneously, and in the same manner, to step 414. At step 426, each passive plug-in module 12 and 14 receives the second framing pulse from the active plug-in module 12. At step 428, each passive plug-in module 12 and 14 receives the transmitted branch circuit ID from the active plug-in module 12 sent in step 418. At step 430, each passive plug-in module 12 and 14 compares the received branch circuit ID with the zero-crossings counted during step 424. If the zero-crossing count correctly corresponds to the received branch circuit ID, method 400 proceeds to step 434 and displays the branch circuit ID on the respective display 58 of the passive plug-in module 12 and 14. If the zero-crossing count does not correctly correspond to the received branch circuit ID, method 400 proceeds to step 432 and displays an error.

Example Embodiment

With continued reference to FIGS. 1-8, an example embodiment may include the mapping of a residential or commercial building electrical system. A qualified user, for example, an electrician may, for example, walk through the building in any desirable route, and ensure all switches are turned off and that all one hundred twenty volt single-phase receptacles are not energizing any equipment. This may be performed for all levels of the building including, for example, office space, garage space, interior and exterior space, and outbuildings that have power. Nothing on the premises should be energized except the mains circuit breaker. The intent of the walk through is for the qualified user to note 1) possible hazardous devices, 2) locations of devices, for example, switches, receptacles, fixtures, or outlets associated with the building electrical system, and 3) to remove stray current sources prior to mapping the electrical system.

Following walk-through of the building, each plug-in module 12 is energized and connected to each receptacle and/or outlet. Switch plates may be removed for connection of energized passive plug-in modules 14 to switches. Light bulbs may be removed from fixtures and plug-in module 12 may, for example, be connected to the lamp base. Passive plug-in modules 14 are connected to switches, and plug-in modules 12 are connected to receptacles, outlets, and fixtures without remote switch control. This is repeated, for example, for all receptacles, switches, fixtures, and outlets, if needed Following connection of plug-in modules 12 and passive plug-in modules 14, the qualified user may proceed to the main electrical circuit breaker panel. All circuit breakers in the main panel and all circuit breakers in sub-panels are turned off except for the main breaker in the main panel. Each single-pole circuit breaker will then be operated in "flick mode." Handheld test device 16 is engaged with the wire attached to the circuit breaker panel 18 for the respective branch circuit. The respective single-pole circuit breaker is operated in the "on-pause-off-on" or "flick mode" manner.

Handheld test device 16 may, by non-contacting dangerous wires, magnetically detect the first and second framing current pulses generated by the active plug-in module 12 for the respective branch circuit. Handheld test device 16 may, by non-contacting dangerous wires, electromagnetically detect the AC voltage and count the number of zero-crossings between the framing current pulses and receive the branch circuit ID of the active plug-in module 12 for the respective branch circuit. The user records or documents this received ID for the corresponding circuit breaker panel 18. This mapping operation is repeated for each circuit breaker panel 18.

Following the recording of each branch circuit ID for each respective branch circuit, the operator turns off the corresponding circuit breaker in circuit breaker panel 18. This process may be repeated for all circuit breakers 18 within a building, in the main panel and, if needed, sub-panels. The user may then walk through the building and record the branch circuit ID or zero-crossing ID displayed by all of the plug-in modules 12 and 14. Because the user knows the branch circuit ID associated with each branch circuit 20a-20n, the user is able to map each outlet, receptacle, switch, and fixture in the building based upon the displayed branch circuit ID of each plug-in module 12 and 14.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system for mapping an electrical circuit, wherein the electrical circuit includes a circuit breaker panel that receives mains power, and wherein the circuit breaker panel provides the mains power as branch power to a branch circuit of the electrical circuit, the system comprising:
- a handheld device comprising a first sensor that senses a current within the electrical circuit at a circuit breaker panel, and a second sensor that senses an electrical field from a voltage within the electrical circuit at the circuit breaker panel;
- a first plug-in device connectable to the branch circuit remote from the circuit breaker panel, the first plug-in device configured to identify itself as an active device using the branch power and transmit an identification number on the branch circuit;
- a second plug-in device connectable to the branch circuit, the second plug-in device configured to identify itself as a passive device based upon a received pulse from the first plug-in device and receive and display the identification number of the first plug-in device; and
- wherein the handheld device receives the identification number from the first plug-in device at the circuit breaker panel and displays the identification number.

2. The system of claim 1, wherein the first plug-in device comprises a pulse transmitter that generates the pulse on the branch circuit to designate the first plug-in device as the active device and provide the identification number, and wherein the second plug-in device comprises a pulse receiver that receives the pulse from the first plug-in device.

3. The system of claim 2, wherein the first plug-in device further comprises:
- a counter configured to count zero-crossings of voltage of the branch power received on the branch circuit; and
- a microcontroller configured to designate the first plug-in device as the active device based on zero-crossing count and to provide the identification number to the pulse transmitter.

4. The system of claim 2, wherein the second plug-in device further comprises:
- a counter configured to count zero-crossings of voltage of the branch power received on the branch circuit; and
- a microcontroller configured to detect the received pulse and display the identification number of the first plug-in device based upon the zero-crossing count.

5. The system of claim 2, further comprising:
- a passive plug-in device comprising:
  - a counter configured to count zero-crossings of voltage of the branch power received on the branch circuit;
  - a voltage pulse receiver configured to receive the pulse from the first plug-in device; and
  - a display configured to output the identification number of the first plug-in device based upon the received pulses and the zero-crossing count; and
- wherein the passive plug-in device is configured to connect to a switch of the branch circuit, and wherein the first and second plug-in devices are configured to connect to outlets or receptacles of the branch circuit.

6. The system of claim 2, wherein the second sensor of the handheld test device is configured to sense zero-crossings on the electrical circuit of the branch power, wherein the first sensor is configured to receive the current pulse from the first plug-in device.

7. The system of claim 6, wherein the handheld device further comprises:
- a microcontroller configured to count the zero-crossings on the electrical circuit and verify the identification number based upon the zero-crossing count.

8. An apparatus for use in mapping an electrical circuit, wherein the electrical circuit includes a circuit breaker panel that receives mains power, and wherein the circuit breaker panel provides the mains power as branch power to a branch circuit of the electrical circuit, and wherein the apparatus is connected to the branch circuit remote from the circuit breaker panel, the apparatus comprising:
- a receiver configured to receive pulses from remote plug-in modules on the branch circuit;
- a transmitter configured to generate the pulses for the remote plug-in modules on the branch circuit; and
- a microcontroller configured to determine a status of the apparatus using the branch power received from the circuit breaker panel, wherein the status is one of an active device and a passive device with relation to the remote plug-in modules connected to the branch circuit; and
- a display configured to display a circuit identification number based upon the status of the apparatus.

9. The apparatus of claim 8, further comprising:
- a first circuit board comprising the receiver and the transmitter; and
- a second circuit board comprising the microcontroller and the display, wherein the second circuit board is galvanically isolated from the first circuit board.

10. The apparatus of claim 8, wherein the apparatus is configured to connect to an outlet of the electrical circuit.

11. The apparatus of claim 8, further comprising a counter configured to count zero-crossings of voltage of the branch power on the electrical circuit, wherein the microcontroller is further configured to receive the zero-crossing count and determine the status of the apparatus based upon the zero-crossing count, and wherein the zero-crossing count begins when the apparatus begins receiving the branch power.

12. The apparatus of claim 11, wherein the microcontroller is configured to designate the status of the apparatus as active if the zero-crossing count reaches a threshold value prior to receiving one of the pulses on the branch circuit from the remote plug-in modules.

13. The apparatus of claim 12, wherein the microcontroller is further configured to designate the apparatus as passive if the receiver receives one of the pulses from the remote plug-in modules prior to the zero-crossing count reaching the threshold value.

14. The apparatus of claim 13, wherein the microcontroller is configured to receive the circuit identification number from one of the remote plug-in modules on the electrical circuit if the status of the apparatus is designated as passive.

15. The apparatus of claim 12, wherein the microcontroller is configured to provide a stored value as the circuit identification number on the electrical circuit to the remote plug-in modules if the apparatus is designated as active.

16. The apparatus of claim 15, wherein the microcontroller is configured to provide the stored value by providing pulses indicative of the stored value on the electrical circuit during the zero-crossings.

17. An apparatus for use in mapping an electrical circuit, wherein the circuit includes a circuit breaker panel that receives mains power, and wherein the circuit breaker panel provides the mains power as branch power to a branch circuit of the electrical circuit, the apparatus comprising:
- a first sensor configured to detect current pulses on the branch circuit at the circuit breaker panel from at least one plug-in module connected to the branch circuit remote from the circuit breaker panel;
- a microcontroller configured to determine an identification number of an active plug-in module of the at least one plug-in module based upon the detected current pulses, wherein the active plug-in module provides the current pulses on the branch circuit while receiving the branch power; and a display configured to output the identification number.

18. The apparatus of claim 17, further comprising:

a second sensor configured to detect zero-crossings of voltage of the branch power on the electrical circuit; and wherein the microcontroller is further configured to count the zero-crossings and verify the identification number of the active plug-in module based upon the count of the zero-crossings.

19. The apparatus of claim 18, wherein the first sensor is a magnetic field sensor and the second sensor is an electrical field sensor.

20. The apparatus of claim 18, wherein the microcontroller is further configured to count the zero-crossings between a first detected current pulse and a second detected current pulse.

* * * * *